United States Patent
Fink et al.

(10) Patent No.: US 10,005,494 B2
(45) Date of Patent: Jun. 26, 2018

(54) ADJUSTABLE WHEEL ALIGNMENT CAM

(71) Applicant: KUHN KRAUSE, INC., Hutchinson, KS (US)

(72) Inventors: Jerome Fink, Hutchinson, KS (US); Charles Westfahl, Hutchinson, KS (US)

(73) Assignee: KUHN KRAUSE, INC., Hutchinson, KS (US)

( * ) Notice: Subject to any disclaimer, the term of this patent is extended or adjusted under 35 U.S.C. 154(b) by 179 days.

(21) Appl. No.: 14/988,115

(22) Filed: Jan. 5, 2016

(65) Prior Publication Data

US 2017/0190360 A1    Jul. 6, 2017

(51) Int. Cl.
*B62D 17/00* (2006.01)
*B60B 35/00* (2006.01)

(52) U.S. Cl.
CPC ............ *B62D 17/00* (2013.01); *B60B 35/009* (2013.01); *B60B 2900/90* (2013.01)

(58) Field of Classification Search
CPC . B62D 17/00; B62D 7/18; B62D 7/20; B60G 2200/4622
USPC .................................................... 280/86.753
See application file for complete search history.

(56) References Cited

U.S. PATENT DOCUMENTS

| | | | |
|---|---|---|---|
| 3,124,370 A * | 3/1964 | Traugott ................. | B60G 7/02 280/86.756 |
| 3,819,202 A * | 6/1974 | Castoe .................... | B60G 7/02 280/86.753 |
| 3,852,872 A * | 12/1974 | Afanador ................ | B23P 11/02 29/447 |
| 4,733,884 A | 3/1988 | Pettibone et al. | |
| 4,736,964 A * | 4/1988 | Specktor ................. | B60G 7/02 280/86.75 |
| 4,795,187 A | 1/1989 | Ingalls | |
| 4,863,187 A | 9/1989 | Artz | |
| 5,163,699 A | 11/1992 | Specktor | |
| 5,263,731 A * | 11/1993 | Deutschel .............. | B60G 3/06 280/124.145 |
| 5,316,332 A * | 5/1994 | Ingalls .................... | B60G 9/00 280/86.754 |
| 6,371,500 B1 | 4/2002 | Goddard | |
| 6,659,479 B1 | 12/2003 | Raidel, II et al. | |
| 6,688,616 B1 | 2/2004 | Ziech | |
| 7,125,026 B2 | 10/2006 | Genick, II | |
| 8,356,839 B1 | 1/2013 | Vey | |
| 8,469,378 B1 * | 6/2013 | Bodary ................... | B62D 7/18 280/93.512 |
| 9,096,259 B2 * | 8/2015 | Varela .................... | B62D 7/18 |

* cited by examiner

*Primary Examiner* — James A English
(74) *Attorney, Agent, or Firm* — Oblon, McClelland, Maier & Neustadt, L.L.P.

(57) ABSTRACT

An apparatus for adjusting the toe and camber of a wheel including a spindle, a spindle sleeve, the spindle disposed inside the spindle sleeve, a spindle sleeve bolt, disposed through the spindle through hole and the spindle sleeve through hole, an alignment cam, including an eccentric cam through hole, a cam bolt head, a spindle cup, the eccentric cam through hole offset from an alignment cam constant center of the alignment cam, and a spindle bolt, securely connecting the alignment cam to the spindle. The alignment cam is connected to a first end of the spindle, with the alignment cam and the spindle disposed inside the spindle sleeve.

11 Claims, 11 Drawing Sheets

FIG. 3A
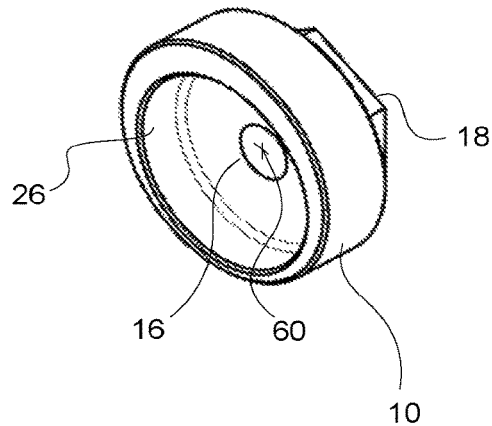
FIG. 3C
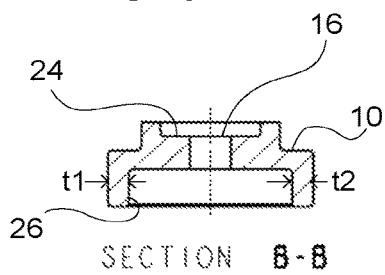
FIG. 3B  FIG. 3D
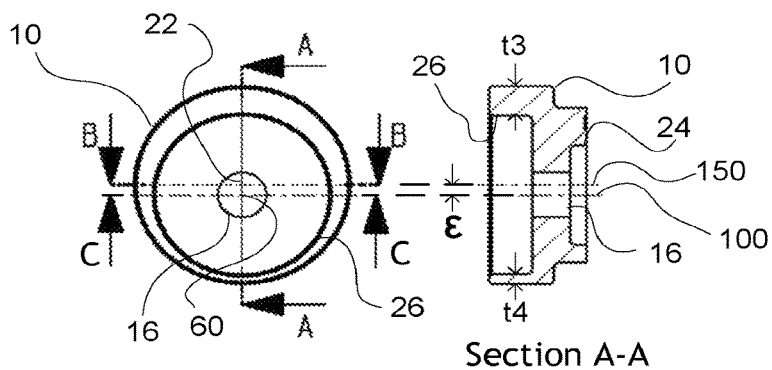
FIG. 3E  FIG. 3F
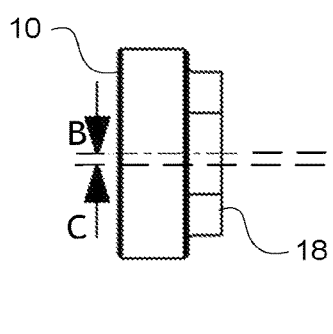 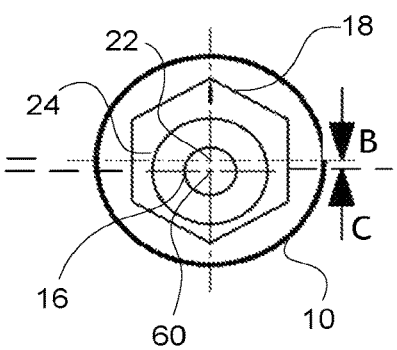

FIG. 4C
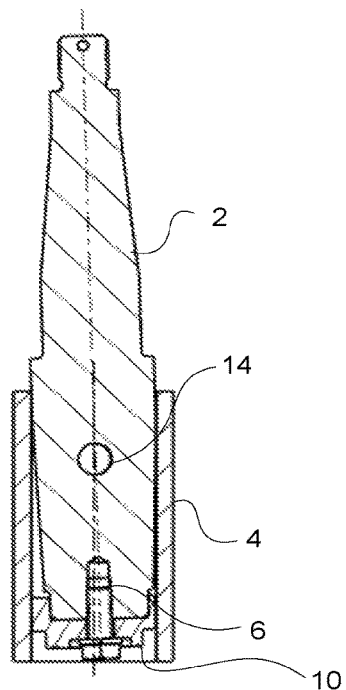
SECTION C-C
← Vehicle direction of travel
FIG. 4B
FIG. 4A
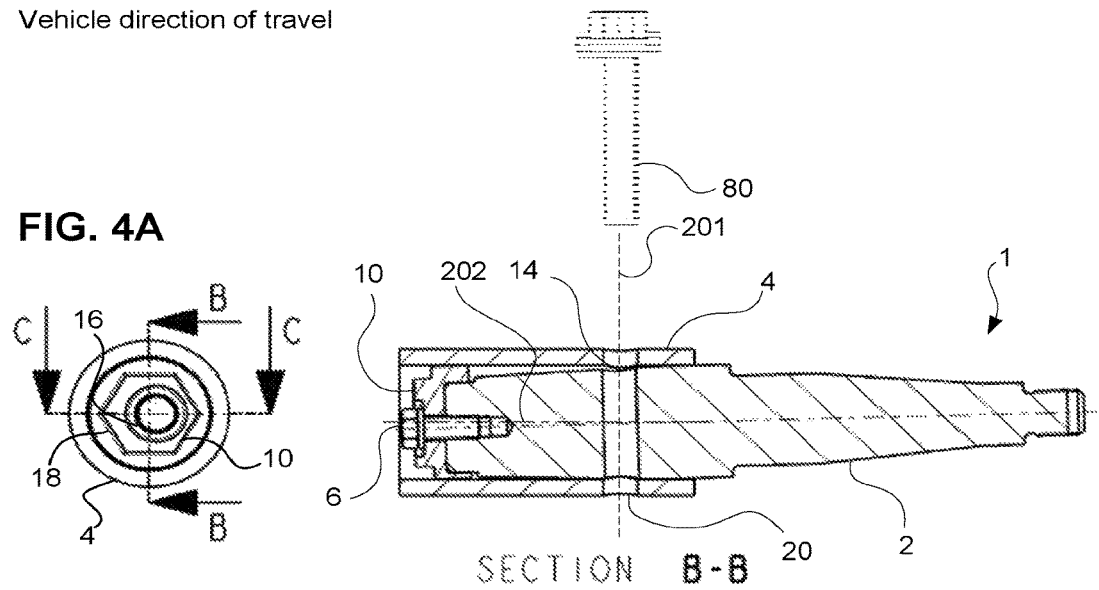
SECTION B-B

SECTION C-C

← Vehicle direction of travel

SECTION B-B

SECTION C-C

← Vehicle direction of travel

SECTION B-B

SECTION C-C

← Vehicle direction of travel

SECTION B-B

ADJUSTABLE WHEEL ALIGNMENT CAM

BACKGROUND

Field of the Disclosure

The present disclosure relates to/is directed toward adjusting the toe and camber of a wheel connected to a vehicle.

Description of the Related Art

FIG. 8A, FIG. 8B, and FIG. 8C are plan views of example cases of a pair of wheels including a left wheel 30a and a right wheel 30b. The left wheel 30a and the right wheel 30b rotate in planes 40a and 40b, respectively. These planes are substantially perpendicular to a centerline 50 about which the left wheel 30a and the right wheel 30b rotate.

FIG. 8A shows that the planes 40a and 40b eventually intersect aft of the centerline 50, signifying a condition of toe-out.

FIG. 8B shows that the planes 40a and 40b eventually intersect ahead of the centerline 50, signifying a condition of toe-in.

FIG. 8C shows that the planes 40a and 40b are parallel, signifying a condition of zero toe.

FIG. 9A, FIG. 9B, and FIG. 9C are front views of example cases of the pair of wheels including the left wheel 30a and the right wheel 30b described in FIG. 8A, FIG. 8B, and FIG. 8C. The left wheel 30a and the right wheel 30b rotate in the planes 40a and 40b, respectively. These planes are substantially perpendicular to the centerline 50 about which the left wheel 30a and the right wheel 30b rotate.

FIG. 9A shows that the planes 40a and 40b eventually intersect below the centerline 50, signifying a condition of positive camber.

FIG. 9B shows that the planes 40a and 40b eventually intersect above the centerline 50, signifying a condition of negative camber.

FIG. 9C shows that the planes 40a and 40b are parallel, signifying a condition of zero camber.

For a pair of wheels located laterally opposite one another on a vehicle, wheel camber describes a relationship between the planes about which the wheels rotate. When viewed from the front or back, if the planes intersect below the centerlines of the wheels then there is a positive camber condition and the tops of the wheels are further apart than the bottoms of the wheels (FIG. 9A). When viewed from the front or back, if the planes intersect about an axis above the centerlines of the wheels then there is a negative camber condition and the tops of the wheels are closer together than the bottoms of the wheels (FIG. 9B). When viewed from the front or back, if the planes don't intersect then there is zero camber (FIG. 9C).

Similarly, for a pair of wheels located laterally opposite one another on a vehicle, toe describes a relationship between the planes about which the wheels rotate. When viewed from the top, if the planes intersect about an axis behind the centerlines of the wheels then there is a toe-out condition (FIG. 8A) and the leading edges of the wheels are further apart than the trailing edges of the wheels. When viewed from the top or plan view, if the planes intersect about an axis in front of the centerlines of the wheels in the direction of travel then there is a toe-in condition (FIG. 8B) and the leading edges of the wheels are closer together than the trailing edges of the wheels. When viewed from the top, if the planes are parallel then there is zero toe (FIG. 8C).

FIG. 10 is an exploded perspective view of an example vehicle 99 equipped with a suspension suitable for use with an adjustable spindle assembly 1, including the alignment cam 10 of this disclosure.

The continued need to improve upon the prior art in the field of vehicle suspension adjustments has resulted in the introduction of a number of mechanisms and methods to adjust the toe and camber to balance various parameters for different operational and transportation requirements as needed.

The art continues to be developed with the aim of improving capabilities of vehicle suspensions during operation in a variety of conditions and, at the same time, minimizing the time, skills, tools and resources needed to make said adjustments.

SUMMARY

The present disclosure is directed to an apparatus for adjusting the toe and camber of a wheel on vehicles equipped with replaceable spindles. The apparatus comprises a spindle, including a through hole perpendicular to its longitudinal axis, a spindle bolt hole that shares its longitudinal centerline with that of the spindle disposed at a first end of the spindle, and a tapered profile. The apparatus further comprises a spindle sleeve, including a substantially constant inner diameter slightly larger than the outer diameter of the spindle at its largest point, and including a spindle sleeve through hole orthogonal to its longitudinal axis. The spindle is positioned inside the length of the spindle sleeve. A spindle sleeve bolt is positioned through the spindle through hole and the spindle sleeve through hole. An alignment cam, including an eccentric cam through hole, a cam bolt head, and a spindle cup, where the eccentric cam through hole is offset from an alignment cam constant center of the alignment cam is connected to the spindle by a spindle bolt. The alignment cam and the spindle are positioned inside the spindle sleeve.

Further, the disclosure is directed toward a method for adjusting the camber and toe of a wheel having an adjustable spindle assembly. The method comprises loosening a spindle bolt inside an eccentric cam through hole of an alignment cam, rotating the alignment cam to change a position of the eccentric cam through hole to pivot the adjustable spindle assembly, and then tightening the spindle bolt to maintain the alignment cam position.

Accordingly, toe and camber of individual wheels are adjustable because the system of the present disclosure applies to each wheel position independently, allowing adjustment to compensate for minor damage and manufacturing variations.

A novel feature of this system and method is that it allows for one adjustment to alter both toe and camber simultaneously instead of requiring separate, independent actions and mechanisms for adjustment of toe and adjustment of camber.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 3A is a perspective view of an example embodiment of an alignment cam;

FIG. 3B is a rear view of an example embodiment of an alignment cam;

FIG. 3C is a section plan view of an example embodiment of an alignment cam;

FIG. 3D is a section side view of an example embodiment of an alignment cam;

FIG. 3E is a side view of an example embodiment of an alignment cam;

FIG. 3F is a front view of an example embodiment of an alignment cam;

FIG. 4A is a front view of an example embodiment of an adjustable spindle assembly connected to a spindle sleeve at a cam rotation angle of zero degrees;

FIG. 4B is a section side view of an example embodiment of an adjustable spindle assembly connected to a spindle sleeve at a cam rotation angle of zero degrees;

FIG. 4C is a section plan view of an example embodiment of an adjustable spindle assembly connected to a spindle sleeve at a cam rotation angle of zero degrees;

FIG. 8B is a plan view of an example case of an axle with toe-in;

DETAILED DESCRIPTION OF THE EMBODIMENTS

Figure 1A:
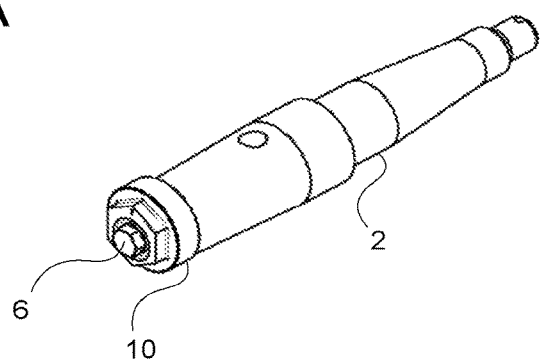
FIG. 1A is a perspective view of an example embodiment of an adjustable spindle assembly.

In the drawings, like reference numerals designate identical or corresponding parts throughout the several views. Further, as used herein, the words "a", "an" and the like generally carry a meaning of "one or more", unless stated otherwise. FIGS. 1-7 are drawn to scale.

FIG. 1A is a perspective view of an example embodiment of an adjustable spindle assembly 1, including a spindle 2, a spindle bolt 6, and an alignment cam 10. The alignment cam 10 is securely connected to an end of the spindle 2 by the spindle bolt 6.

Figure 1B:
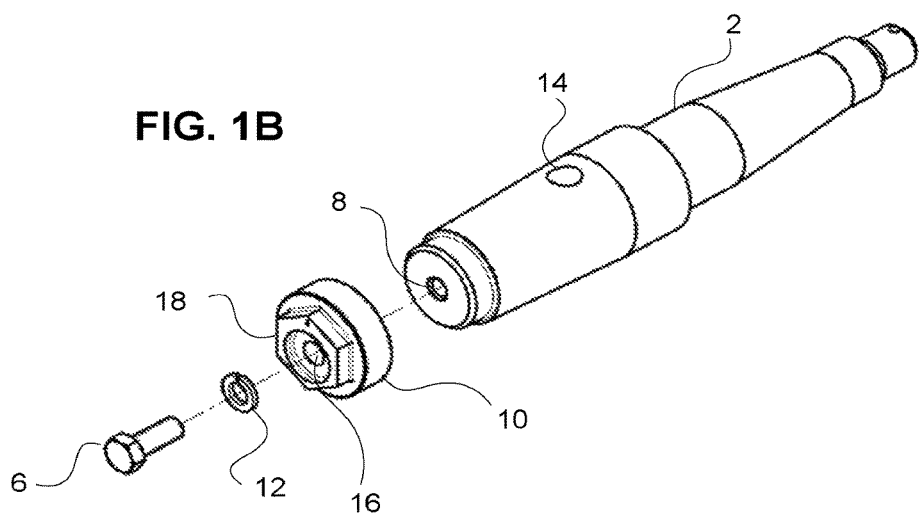
FIG. 1B is a perspective exploded view of an example embodiment of an adjustable spindle assembly.

FIG. 1B is a perspective exploded view of the adjustable spindle assembly 1 including the spindle 2, the alignment cam 10, the lock washer 12, and the spindle bolt 6. The spindle 2 has a spindle through hole 14 and a spindle bolt hole 8 where the spindle bolt hole 8 is threaded to match the spindle bolt 6. The alignment cam 10 has an eccentric cam through hole 16 and a cam bolt head 18. The eccentric cam through hole 16 is the counter-bore for the head of the spindle bolt 6 as it secures the alignment cam 10 to the spindle 2. The center of the eccentric cam through hole 16 is eccentric with respect to the center of the alignment cam 10 (described further by FIG. 3G). The cam bolt head 18 is a surface by which a tool can attach to adjust the axial position of the alignment cam 10 relative to the spindle 2. In one embodiment the cam bolt head 18 is a hexagonal shape. The face of the alignment cam 10 opposite the cam bolt head 18 is connected to the end of the spindle 2 that has the spindle bolt hole 8. The alignment cam 10 can be rotated substantially about the longitudinal axis of the spindle bolt hole 8 and rigidly connected to the spindle 2 by tightening of the spindle bolt 6, which is axially disposed inside the lock washer 12, the eccentric cam through hole 16, and the spindle bolt hole 8. The effects of rotation of the alignment cam 10 about the spindle 2 are described in further detail by FIG. 3G.

Figure 1C:
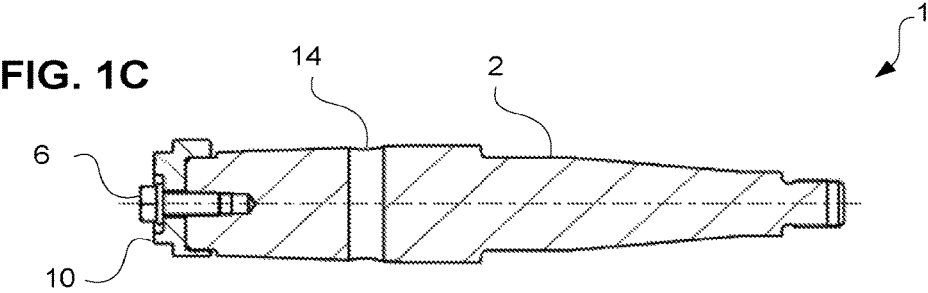
FIG. 1C is a sectional side view of an example embodiment of an adjustable spindle assembly.

FIG. 1C is a sectional side view of the adjustable spindle assembly 1, as described by FIG. 1A, including the spindle 2, the spindle bolt 6, the alignment cam 10, and the spindle through hole 14. The alignment cam 10 is securely connected to the spindle 2 by the spindle bolt 6, which when tightened, shares its central longitudinal axis with that of the spindle 2 but not the alignment cam 10. The central longitudinal axis of the alignment cam 10 is always offset to that of the spindle bolt 6 and the spindle 2 when connected to the spindle 2.

Figure 2A:
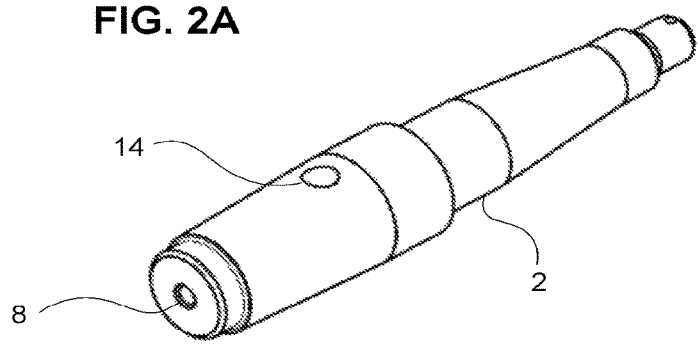
FIG. 2A is a perspective view of an example embodiment of a spindle.

FIG. 2A is a perspective view the spindle 2 including the spindle bolt hole 8 and the spindle through hole 14. The longitudinal centerline of the spindle through hole 14 is perpendicular to and intersects the central longitudinal axis of the spindle 2, the spindle 2 having circular cross sections of varying diameter over the course of its length.

Figure 2B:
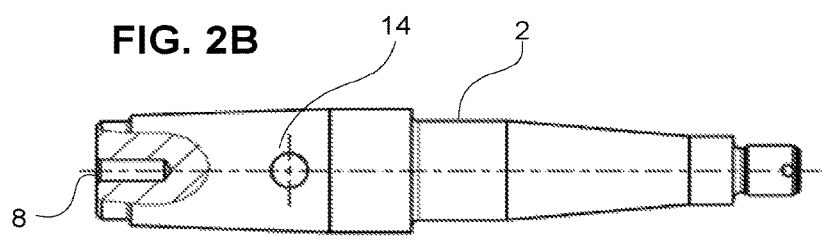
FIG. 2B is a partial section plan view of an example embodiment of a spindle.

FIG. 2B is a partial section plan view of the spindle 2 including the spindle bolt hole 8 and the spindle through hole 14, as described by FIG. 2A. The length of the spindle 2 includes a tapered end 2a where the spindle bolt hole 8 is located to provide clearance for movement inside a spindle sleeve 4 (described in subsequent figures beginning with FIG. 4A). The end 2b of the spindle 2 disposed opposite the spindle bolt hole 8 serves as a mounting shaft for a wheel (not shown), with a rotational axis located on the longitudinal axis of the spindle 2.

Figure 2C:
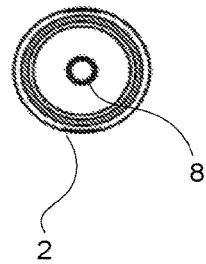
FIG. 2C is a front view of an example embodiment of a spindle.

FIG. 2C is a front view of the spindle 2 including the spindle bolt hole 8. This view further illustrates the tapered nature of the contours of the spindle 2.

Figure 2D:
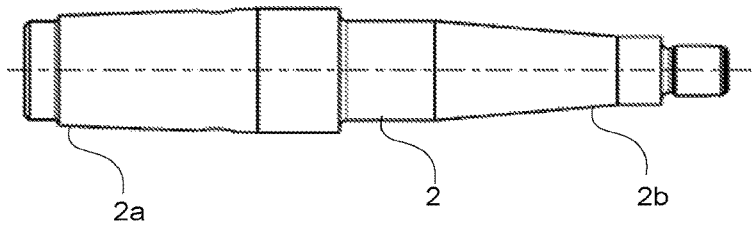
FIG. 2D is a side view of an example embodiment of a spindle.

FIG. 2D is a side view illustrating the tapered contours of each end of the spindle 2.

Figure 3G:
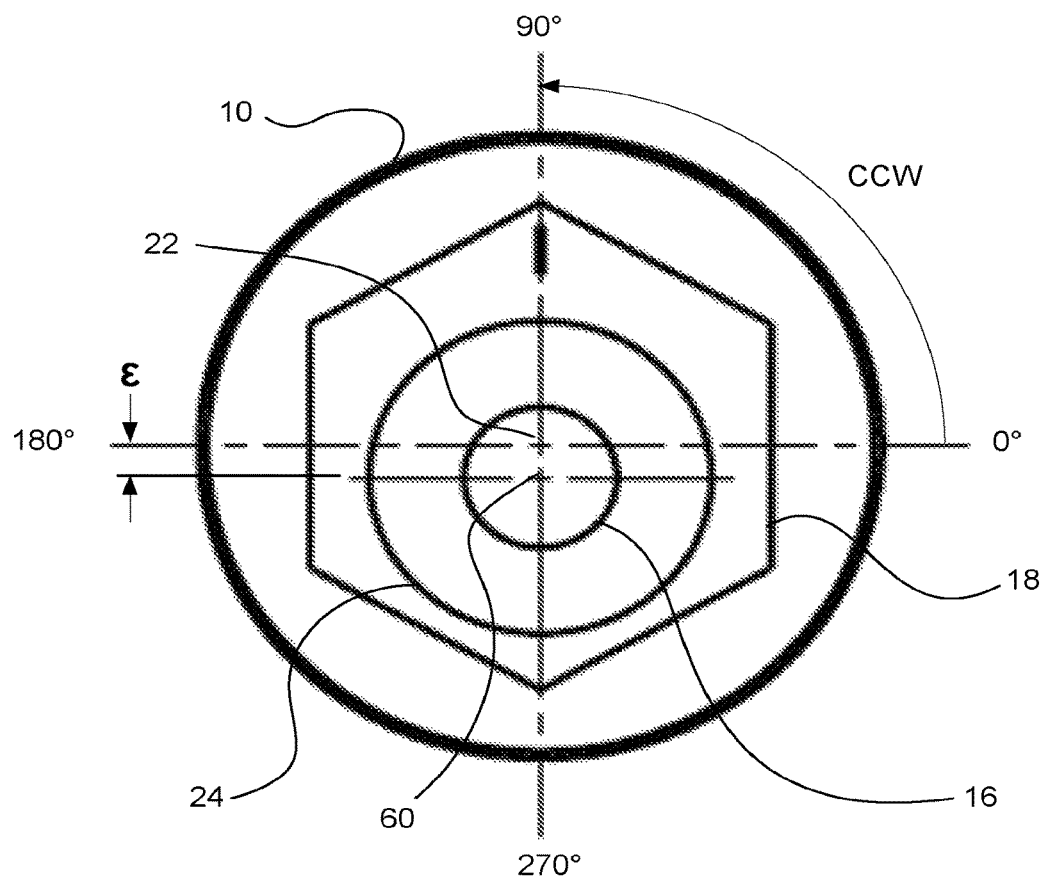
FIG. 3G is a front view of an alignment cam superimposed on a polar coordinate system.

FIG. 3A is a perspective view of the alignment cam 10, including the eccentric cam through hole 16, the cam bolt head 18, and a spindle cup 26. An eccentric cam hole center 60 of the eccentric cam through hole 16 is offset to the central longitudinal axis of the alignment cam 10 by an amount $\varepsilon$ (see FIG. 3G). The central longitudinal axis of the spindle cup 26 is the same as that of the eccentric cam through hole 16. The cam bolt head 18, located on one side of the alignment cam 10, shares its central longitudinal axis with the alignment cam 10. Any rotation of the cam bolt head 18 is about the same axis as that of the alignment cam 10 rather than that of the eccentric cam through hole 16.

FIG. 3B is a rear view of the alignment cam 10 including the eccentric cam through hole 16, the eccentric cam hole center 60, and the spindle cup 26. The substantially vertical A-A axis is orthogonal to the B-B axis. The eccentric cam through hole 16 and the spindle cup 26 share the same eccentric cam hole center 60 that is eccentrically offset some distance $\varepsilon$ (FIG. 3G) from the alignment cam constant center 22 of the alignment cam 10.

FIG. 3C is a section plan view of the alignment cam 10 along axis B-B including the eccentric cam through hole 16, the cam counter-bore hole 24, and the spindle cup 26. The cam counter-bore hole 24 creates a mating surface with the head of the spindle bolt 6 (FIG. 1B) when disposed in line with the eccentric cam through hole 16 along axis 100. The end of the spindle 2 having the spindle bolt hole 8 (FIG. 2A) fits inside the spindle cup 26. A wall thickness t1 of the spindle cup 26 is substantially the same as a wall thickness t2 of the spindle cup 26 since the spindle cup 26 is centered in this view.

FIG. 3D is a section side view of the alignment cam 10 along axis A-A including the eccentric cam through hole 16, the cam counter-bore hole 24, and the spindle cup 26, similar to the view of FIG. 3C. Whereas the view of FIG. 3C does not show the offset of the spindle cup 26 and the eccentric cam through hole 16, the section side view shows the offset of the spindle cup 26 and the eccentric cam through hole 16 from the central longitudinal axis 150 of the alignment cam 10, which is parallel to axis 100. The cam counter-bore hole 24 creates a mating surface with the head of the spindle bolt 6 (FIG. 1B) when disposed inside the eccentric cam through hole 16. The spindle cup 26 creates a mating surface for the spindle 2, allowing the end with the spindle bolt hole 8 to fit inside the alignment cam 10. A wall thickness t3 of the spindle cup 26 is substantially greater than a wall thickness t4 of the spindle cup 26 since the spindle cup 26 has an eccentricity $\varepsilon$ in this view.

FIG. 3E is a side view of the alignment cam 10, similar to that described by FIG. 3D, including the cam bolt head 18.

FIG. 3F is a front view of the alignment cam 10 including the eccentric cam through hole 16, eccentric cam hole center 60, the cam bolt head 18, and the cam counter-bore hole 24. This view is the opposite face of the alignment cam 10 described by FIG. 3B.

FIG. 3G is a diagram of a front view of the alignment cam 10, superimposed on a polar coordinate system, including the eccentric cam through hole 16, the cam bolt head 18, the cam counter-bore hole 24, and an alignment cam constant center 22. The alignment cam 10 is centered about the alignment cam constant center 22, and the eccentric cam hole center 60 of the eccentric cam through hole 16 and the cam counter-bore hole 24 have an eccentricity $\varepsilon$ with respect to the alignment cam constant center 22. Rotation of the alignment cam 10 about the alignment cam constant center 22 changes the relative position of the center of the eccentric cam through hole 16 with respect to a vehicle (not shown) connected to the spindle sleeve 4 described in subsequent figures.

In an example embodiment, the eccentricity $\varepsilon$ is 0.125 inches. The degree of eccentricity $\varepsilon$ is designed to provide a range of toe and camber angles required to correct the camber and toe position for a given suspension layout. Adjustment is accomplished by loosening the spindle bolt 6, using a tool to rotate the cam bolt head 18 and adjust the spindle 2 to a desired position, and then tightening the spindle bolt 6 to maintain the spindle 2 position (FIG. 1A and FIG. 1B).

In another example embodiment, the eccentricity $\varepsilon$ of the alignment cam is zero, the center of the eccentric cam through hole 16 is the same as that of the alignment cam constant center 22, and the position of the alignment cam 10 results in a condition where the wheel connected to the spindle 2 is disposed with zero toe and zero camber at all cam rotation angles of rotation. For a given suspension design, if the alignment cam 10 has any amount of eccentricity $\varepsilon$ greater than zero, the toe and camber adjustments achieved will follow the pattern described below. However, the magnitude of toe and camber will be proportional to the amount of eccentricity $\varepsilon$. Further, if the alignment cam 10 has any amount of eccentricity $\varepsilon$ then it will not have an adjustment position where both toe and camber are zero. There will always be some amount of toe, camber, or both. The relatively high mass of the vehicle to the mass of the suspension, and the potentially large mass difference between its laden and unladen conditions, will produce flexing or bending of various chassis and suspension components such that some amount of toe or camber will be desirable to counter the effects of the flexing or bending.

All subsequent figures describe the embodiment of the adjustable spindle assembly 1 connected to the spindle sleeve 4, with the alignment cam 10, having an eccentricity $\varepsilon$ that is not zero, disposed at various cam rotation angles with respect to the spindle 2 and the spindle sleeve 4 by a polar coordinate system described by FIG. 3G.

The centerline of the spindle through hole 14 is disposed such that it is substantially in line with the centerline of the through hole 20, the through hole 20 disposed through both sides of the spindle sleeve 4.

The spindle sleeve 4 is connected to the vehicle suspension and has a cylindrical shape. The longitudinal centerline 201 of the through hole 20 intersects and is orthogonal to the longitudinal centerline 202 of the spindle sleeve 4. The inner diameter of the spindle sleeve 4 is slightly larger than the outer diameter of the alignment cam 10 and slightly larger than the largest diameter along the length of the spindle 2, allowing the adjustable spindle assembly 1 to pivot along its longitudinal axis relative to the longitudinal axis of the spindle sleeve 4 when disposed inside the spindle sleeve 4.

The alignment cam 10 and the spindle 2 fit inside the spindle sleeve 4, which has an inner diameter that is approximately 1/16" larger than the outer diameter of the alignment cam 10 and the spindle 2, with a loose fit and can be inserted by hand. A spindle sleeve bolt 80 disposed through the through hole 20 each side of the spindle sleeve 4 and through the spindle through hole 14 secures the spindle 2 to the spindle sleeve 4. Wheel camber and toe are adjusted by rotation of the alignment cam 10 due to the position of the eccentric cam through hole 16 and its eccentricity ε with the alignment cam constant center 22. Adjustment of the alignment cam 10 allows the spindle 2 to pivot within the spindle sleeve 4, producing the toe and camber positions described below. The descriptions of the angular adjustments of the alignment cam 10 below are applicable under normal operating conditions. Adjustment of the alignment cam 10 may not produce the stated camber and toe outcomes if any components are damaged or otherwise deviate from specification. In such a case, adjustment of the alignment cam 10 could be used to compensate for certain types and magnitude of damage, for example if a spindle is slightly bent, in an effort to maintain desired wheel toe and camber.

The alignment cam 10 is adjustable to any angular position. The following table illustrates the toe and camber of a vehicle's right side suspension at certain positions of the alignment cam 10 angle relative to the coordinate system described by FIG. 3G. Asterisks (*) denote where each setting is at a negative or positive maximum for its range of adjustment.

The toe angle is positive between the range of 90 to 270 degrees, with maximum positive toe at 180 degrees. At 90 and 270 degrees the toe angle is zero degrees. The toe angle is negative between the range of 270 to 90 degrees, with maximum negative toe at zero degrees.

The camber angle is positive between the range of zero to 180 degrees, with maximum positive camber at 90 degrees. At zero and 180 degrees the camber angle is zero degrees. The camber angle is negative between the range of 180 to 360 (same as zero) degrees, with maximum negative camber at 270 degrees.

| Alignment Cam Angle | Toe Angle | Camber Angle |
|---|---|---|
| 0° | Negative* | 0 |
| 45° | Negative | Positive |
| 90° | 0 | Positive* |
| 135° | Positive | Positive |
| 180° | Positive* | 0 |
| 225° | Positive | Negative |
| 270° | 0 | Negative* |
| 315° | Negative | Negative |

The magnitude of toe and camber can be designed to vary with the cam and vehicle suspension design. In one example, a cam is designed to provide an adjustment range of one degree of toe and camber for a given vehicle. In another example, a cam is designed to provide an adjustment range of two degrees of toe and camber for the same vehicle.

Further, another novel feature of the alignment cam 10 is symmetry. The alignment cam can be used on both the right side and the side of an axle. The direction of travel of the vehicle is indicated in FIG. 4C, FIG. 5C, FIG. 6C, and FIG. 7C, the alignment cam 10 in each case disposed at the in-board end of the right side of the vehicle, for example. However, for a case where the alignment cam 10 is placed on the left side of the vehicle, the cam rotation method is the same except that the adjustments are a mirror image of right side adjustments. Since the same components are used on both the left side and right side of the vehicle, assembly and adjustment are simpler because fewer parts are needed. Parts inventories for the manufacturer, dealers, and operators are also reduced.

FIG. 4A, FIG. 4B, and FIG. 4C are embodiments of the adjustable spindle assembly 1 and the spindle sleeve 4, with the alignment cam 10 disposed at a cam rotation angle of zero degrees when viewed from the front view (FIG. 4A).

FIG. 4A is a front view of the alignment cam 10 connected to the spindle sleeve 4 at the cam rotation angle of zero degrees.

FIG. 4B is a section side view the spindle 2 connected to the spindle sleeve 4, the spindle bolt 6, and the alignment cam 10 disposed at the cam rotation angle of zero degrees. The centerline of the spindle through hole 14 is approximately in line with the centerline of the through hole 20, though there is a degree of relative freedom to allow for adjustment, and a bolt 80 is disposed with a loose fit through the spindle through hole 14 and the through hole 20 connects the spindle 2 and the spindle sleeve 4. The loose fit of bolt 80 is important to allow the spindle 2 and the spindle sleeve 4 to move relative to each other for adjustment while remaining connected.

FIG. 4C is a section plan view of the spindle 2 connected to the spindle sleeve 4, the spindle bolt 6, and the alignment cam 10 disposed at the cam rotation angle of zero degrees.

Figure 8A:
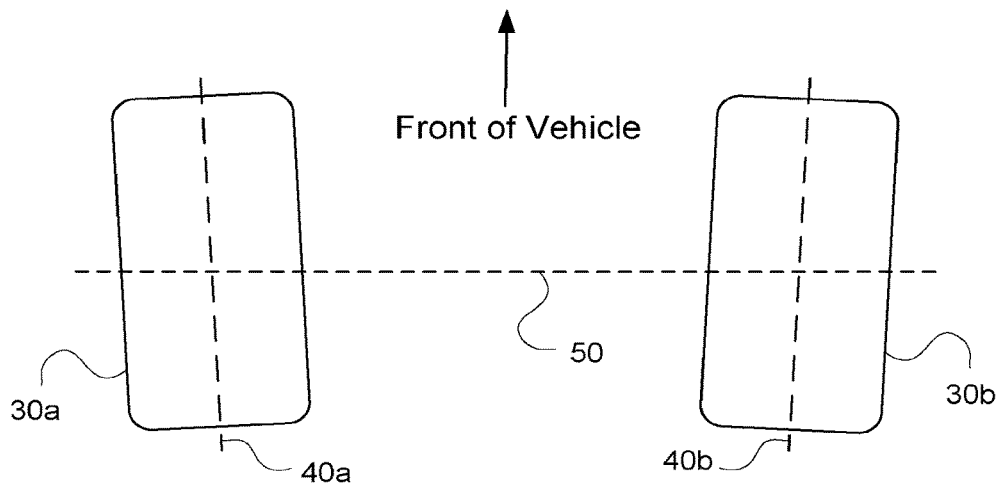
FIG. 8A is a plan view of an example case of an axle with toe-out.
Figure 8B:
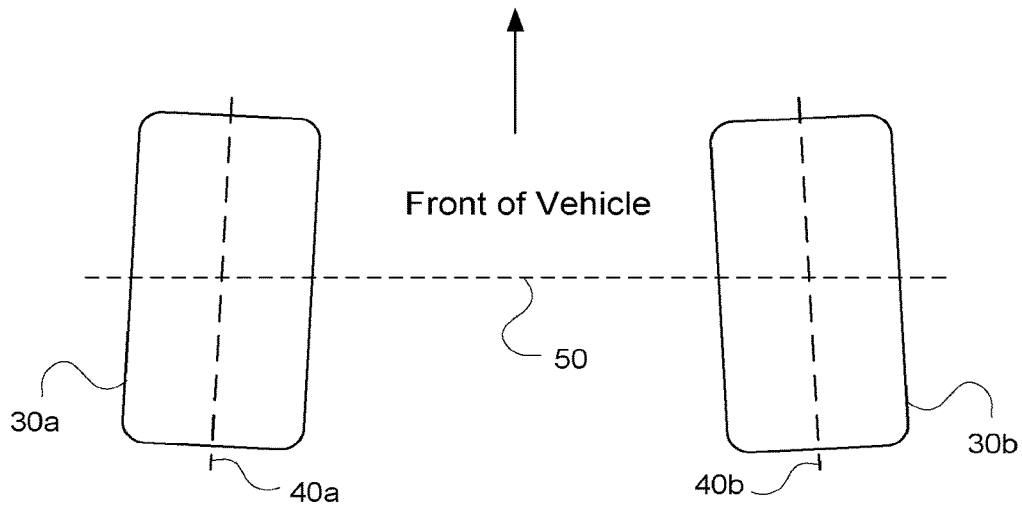
Figure 9A:
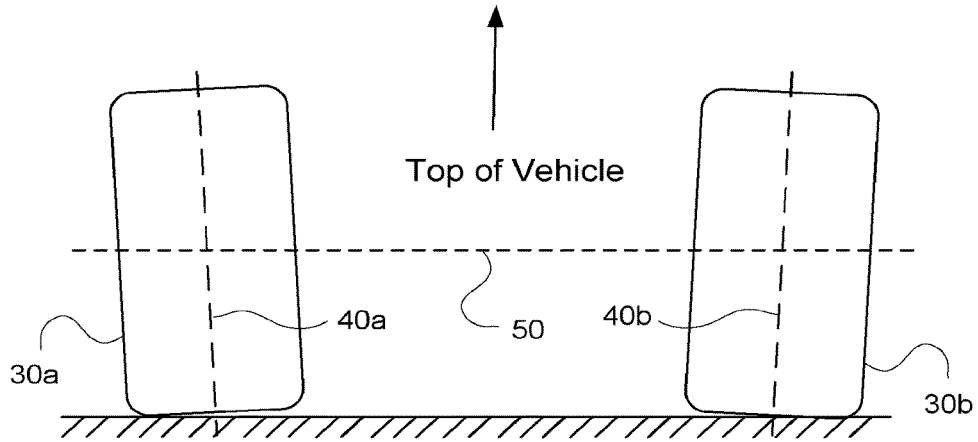
FIG. 9A is a front view of an example case of an axle with positive camber.
Figure 9B:
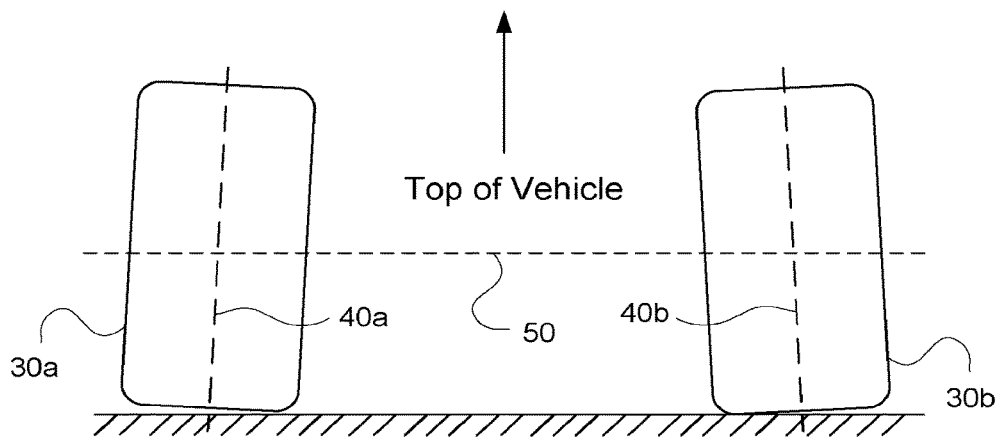
FIG. 9B is a front view of an example case of an axle with negative camber.
Figure 9C:
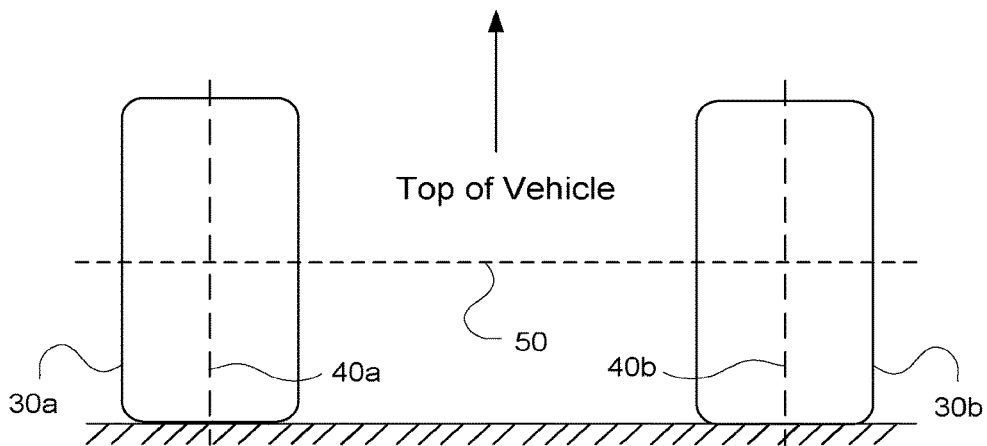
FIG. 9C is a front view of an example case of an axle with zero camber.
Figure 10:
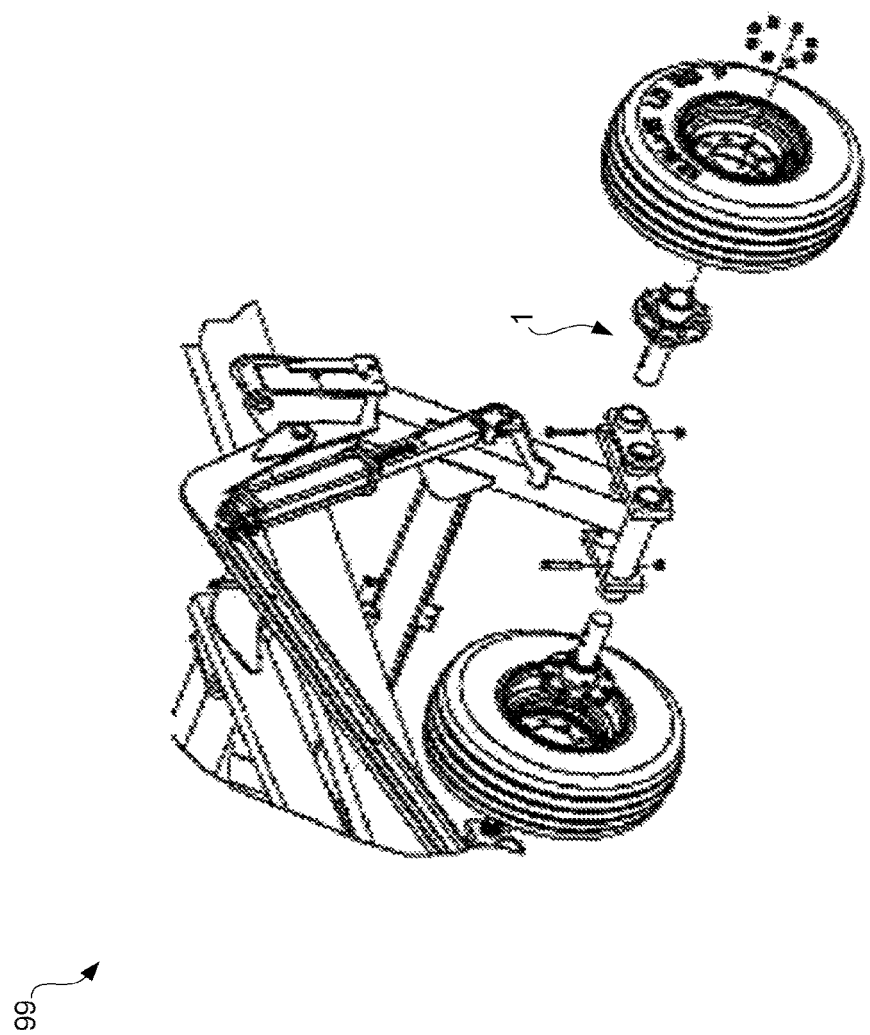
FIG. 10 is an exploded perspective view of a vehicle equipped with a suspension suitable for use with an adjustable spindle assembly, including the wheel alignment cam of this disclosure.

The position of the alignment cam 10 results in a condition where the wheel connected to the spindle 2 is disposed with toe-in and zero camber (FIG. 8B AND FIG. 9C).

FIG. 5A, FIG. 5B, FIG. 5C, and FIG. 5D are embodiments of the adjustable spindle assembly 1 and the spindle sleeve 4, with the alignment cam 10 disposed at a cam rotation angle of 45 degrees counter-clockwise (CCW), relative to FIG. 4A.

Figure 5C:
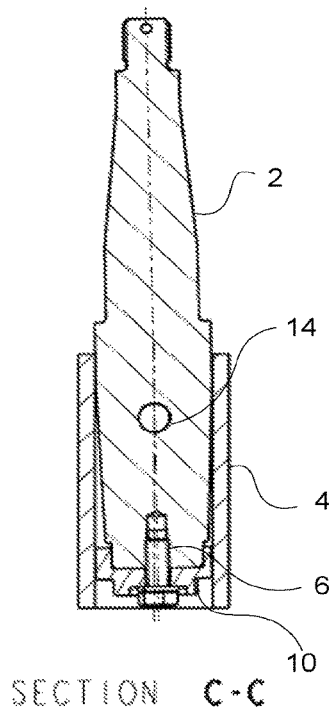
FIG. 5C is a section plan view of an example embodiment of an adjustable spindle assembly connected to a spindle sleeve at a cam rotation angle of 45 degrees.
Figure 5D:
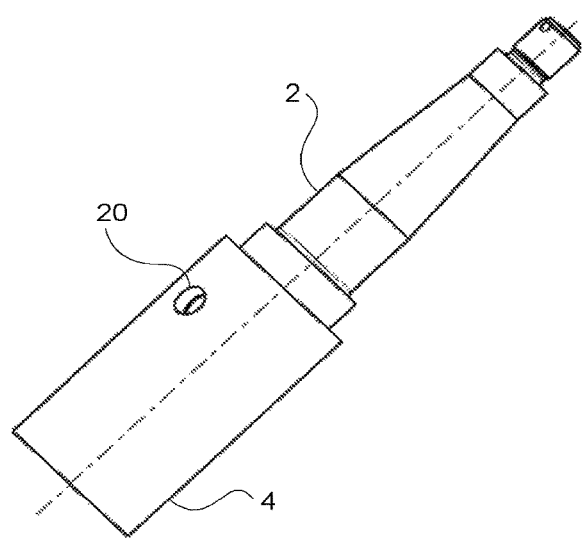
FIG. 5D is a side view of an example embodiment of an adjustable spindle assembly connected to a spindle sleeve at a cam rotation angle of 45 degrees.
Figure 5A:
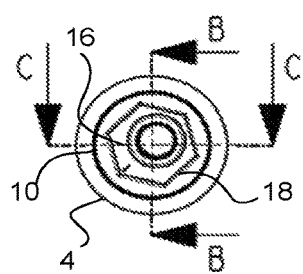
FIG. 5A is a front view of an example embodiment of an adjustable spindle assembly connected to a spindle sleeve at a cam rotation angle of 45 degrees.

FIG. 5A is a front view of the alignment cam 10 connected to the spindle sleeve 4 at the cam rotation angle of 45 degrees.

Figure 5B:
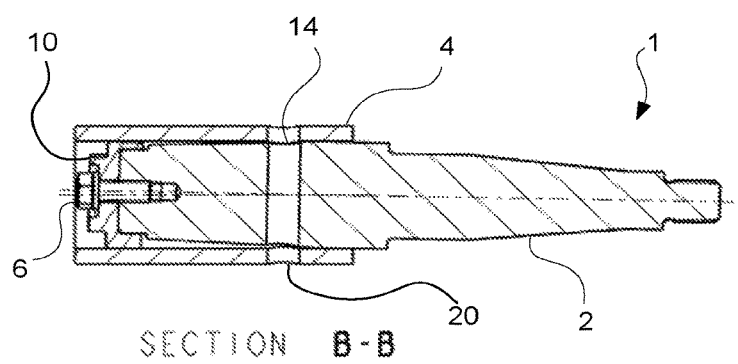
FIG. 5B is a section side view of an example embodiment of an adjustable spindle assembly connected to a spindle sleeve at a cam rotation angle of 45 degrees.

FIG. 5B is a section side view the spindle 2 connected to the spindle sleeve 4, the spindle bolt 6, and the alignment cam 10 disposed at the cam rotation angle of 45 degrees.

FIG. 5C is a section plan view of the spindle 2 connected to the spindle sleeve 4, the spindle bolt 6, and the alignment cam 10 disposed at the cam rotation angle of 45 degrees.

FIG. 5D is a side view of the spindle 2 connected to the spindle sleeve 4, the alignment cam 10 disposed at the cam rotation angle of 45 degrees.

The position of the alignment cam 10 results in a condition where the wheel connected to the spindle 2 is disposed with toe-in and positive camber (FIG. 8B AND FIG. 9A).

Figure 6C:
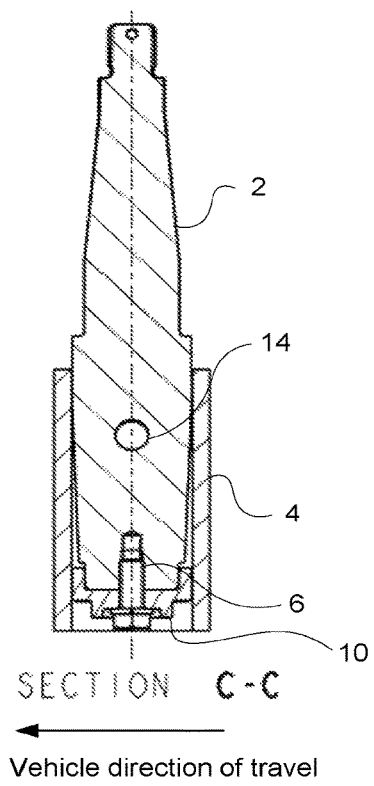
FIG. 6C is a section plan view of an example embodiment of an adjustable spindle assembly connected to a spindle sleeve at a cam rotation angle of 90 degrees.
Figure 6A:
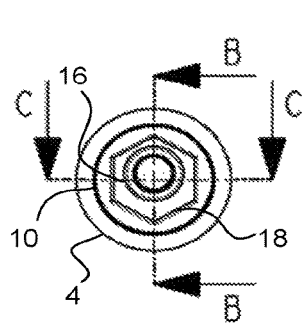
FIG. 6A is a front view of an example embodiment of an adjustable spindle assembly connected to a spindle sleeve at a cam rotation angle of 90 degrees.
Figure 6B:
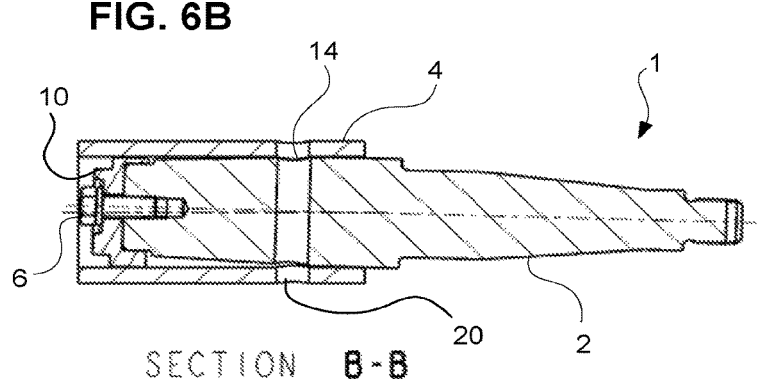
FIG. 6B is a section side view of an example embodiment of an adjustable spindle assembly connected to a spindle sleeve at a cam rotation angle of 90 degrees.

FIG. 6A, FIG. 6B, and FIG. 6C are embodiments of the adjustable spindle assembly 1 and the spindle sleeve 4, with the alignment cam 10 disposed at a cam rotation angle of 90 degrees when viewed from the front view (FIG. 6A).

FIG. 6A is a front view of the alignment cam 10 connected to the spindle sleeve 4 at the cam rotation angle of 90 degrees.

FIG. 6B is a section side view the spindle 2 connected to the spindle sleeve 4, the spindle bolt 6, and the alignment cam 10 disposed at the cam rotation angle of 90 degrees.

FIG. 6C is a section plan view of the spindle 2 connected to the spindle sleeve 4, the spindle bolt 6, and the alignment cam 10 disposed at the cam rotation angle of 90 degrees.

Figure 8C:
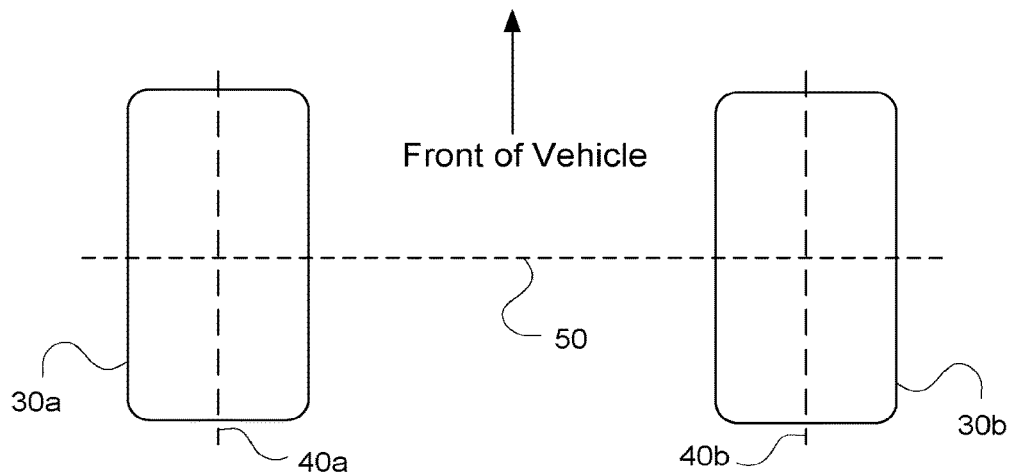
FIG. 8C is a plan view of an example case of an axle with zero toe.

The position of the alignment cam 10 results in a condition where the wheel connected to the spindle 2 is disposed with zero toe and positive camber (FIG. 8C AND FIG. 9A).

Figure 7C:
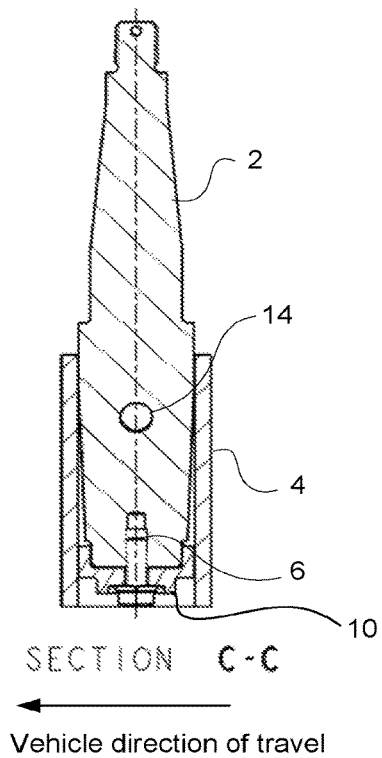
FIG. 7C is a section plan view of an example embodiment of an adjustable spindle assembly connected to a spindle sleeve at a cam rotation angle of 270 degrees.
Figure 7A:
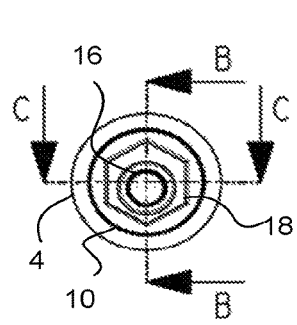
FIG. 7A is a front view of an example embodiment of an adjustable spindle assembly connected to a spindle sleeve at a cam rotation angle of 270 degrees.
Figure 7B:
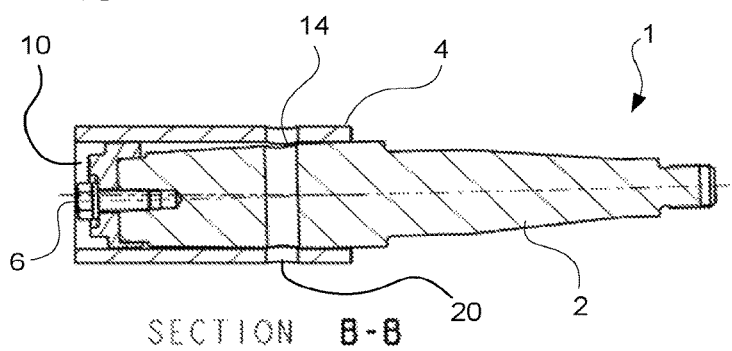
FIG. 7B is a section side view of an example embodiment of an adjustable spindle assembly connected to a spindle sleeve at a cam rotation angle of 270 degrees.

FIG. 7A, FIG. 7B, and FIG. 7C are embodiments of the adjustable spindle assembly 1 and the spindle sleeve 4, with the alignment cam 10 disposed at a cam rotation angle of 270 degrees when viewed from the front view (FIG. 7A).

FIG. 7A is a front view of the alignment cam 10 connected to the spindle sleeve 4 at the cam rotation angle of 270 degrees.

FIG. 7B is a section side view the spindle 2 connected to the spindle sleeve 4, the spindle bolt 6, and the alignment cam 10 disposed at the cam rotation angle of 270 degrees.

FIG. 7C is a section plan view of the spindle 2 connected to the spindle sleeve 4, the spindle bolt 6, and the alignment cam 10 disposed at the cam rotation angle of 270 degrees.

The position of the alignment cam 10 results in a condition where the wheel connected to the spindle 2 is disposed with zero toe and negative camber (FIG. 8C AND FIG. 9B).

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. An apparatus for adjusting toe and camber of a wheel comprising:
    a spindle, including a through hole perpendicular to a longitudinal axis of the spindle, a spindle bolt hole with a longitudinal centerline aligned with the longitudinal axis of the spindle disposed at a first end of the spindle, and a tapered profile;
    a spindle sleeve, including a substantially constant inner diameter slightly larger than an outer diameter of the spindle at a largest point of the outer diameter of the spindle, and including a spindle sleeve through hole orthogonal to a longitudinal axis of the spindle sleeve, and the spindle disposed inside the spindle sleeve;
    a spindle sleeve bolt, disposed through the spindle through hole and the spindle sleeve through hole;
    an alignment cam, including an eccentric cam through hole, a cam bolt head, and a spindle cup, the eccentric cam through hole offset from an alignment cam constant center of the alignment cam; and
    a spindle bolt, securely connecting the alignment cam to the spindle;
    wherein the alignment cam is connected to the first end of the spindle, the alignment cam and the spindle disposed inside the spindle sleeve, and a position of the spindle changes relative to that of the spindle sleeve based on a rotational position of the alignment cam.

2. The apparatus according to claim 1, wherein:
the eccentric cam through hole has an eccentricity to the alignment cam constant center of 0.125 inches to 0.250 inches.

3. The apparatus according to claim 1, wherein:
the alignment cam is positioned such that the wheel has toe-in and one of negative camber, zero camber, or positive camber.

4. The apparatus according to claim 1, wherein:
the alignment cam is positioned such that the wheel has zero toe and one of negative camber or positive camber.

5. The apparatus according to claim 1, wherein:
the alignment cam is positioned such that the wheel has toe-out and one of negative camber, zero camber, or positive camber.

6. A vehicle including the apparatus for adjusting toe and camber of the wheel as claimed in claim 1.

7. A method for adjusting a camber and a toe of a wheel having the apparatus according to claim 1, the method comprising:
    loosening the spindle bolt inside the eccentric cam through hole of the alignment cam;
    rotating the alignment cam to change a position of the eccentric cam through hole to pivot the apparatus; and
    tightening the spindle bolt to maintain the alignment cam position.

8. The method of claim 7, further comprising:
rotating the alignment cam to a position where the wheel has toe-in and one of negative camber, zero camber, or positive camber.

9. The method of claim 7, further comprising:
rotating the alignment cam to a position where the wheel has zero toe and one of negative camber or positive camber.

10. The method of claim 7, further comprising:
rotating the alignment cam to a position where the wheel has toe-out and one of negative camber, zero camber, or positive camber.

11. The method of claim 7, further comprising:
replacing the alignment cam with a second alignment cam with a different amount of eccentricity;
connecting the second alignment cam to a vehicle.

* * * * *